United States Patent
Engalitcheff, Jr.

[11] 3,929,435
[45] Dec. 30, 1975

[54] METHOD OF MULTI STAGE INJECTOR COOLING

[75] Inventor: John Engalitcheff, Jr., Gibson Island, Md.

[73] Assignee: Baltimore Aircoil Company, Inc., Jessup, Md.

[22] Filed: Mar. 11, 1974

[21] Appl. No.: 449,781

Related U.S. Application Data

[63] Continuation of Ser. No. 183,015, Sept. 23, 1971, abandoned.

[52] U.S. Cl. .................. 55/94; 55/229; 55/257; 261/23 R; 261/24; 261/76; 261/116; 261/128; 261/146; 261/151; 261/DIG. 11
[51] Int. Cl.² .......................................... B01D 47/06
[58] Field of Search ............ 261/115, 116, DIG. 11, 261/76, 78, 127, 128, 146, 151, 21, 23 A, 24; 55/257, 228, 229, 84, 93, 94

[56] References Cited
UNITED STATES PATENTS

| | | |
|---|---|---|
| 1,986,653 | 1/1935 | Wade .......................... 261/DIG. 11 |
| 2,127,581 | 8/1938 | Baruch et al. .................. 261/146 X |
| 2,512,271 | 6/1950 | Green ............................. 261/21 X |
| 2,732,192 | 1/1956 | Johnson et al. ................. 261/23 R |
| 2,887,307 | 5/1959 | Koch................................ 261/24 |
| 3,360,906 | 1/1968 | Parkinson ......................... 261/116 |
| 3,608,274 | 9/1971 | Stingelin et al. ...................... 55/84 |

FOREIGN PATENTS OR APPLICATIONS

| | | | |
|---|---|---|---|
| 718,487 | 11/1954 | United Kingdom................ 261/116 |
| 734,185 | 7/1955 | United Kingdom.............. 261/23 R |
| 510,242 | 7/1971 | Switzerland................. 261/DIG. 11 |
| 2,029,761 | 10/1970 | France | |

*Primary Examiner*—Frank W. Lutter
*Assistant Examiner*—William Cuchlinski, Jr.
*Attorney, Agent, or Firm*—Michael C. Sudol, Jr.

[57] ABSTRACT

A method of staging of injector type evaporative heat exchangers in such a way that the water to have heat extracted from it flows through the stages in series but comes into contact with a new volume of air at each stage. Dramatic reductions in size of unit required to deal with high loads is achieved without increase in horsepower requirements.

6 Claims, 3 Drawing Figures

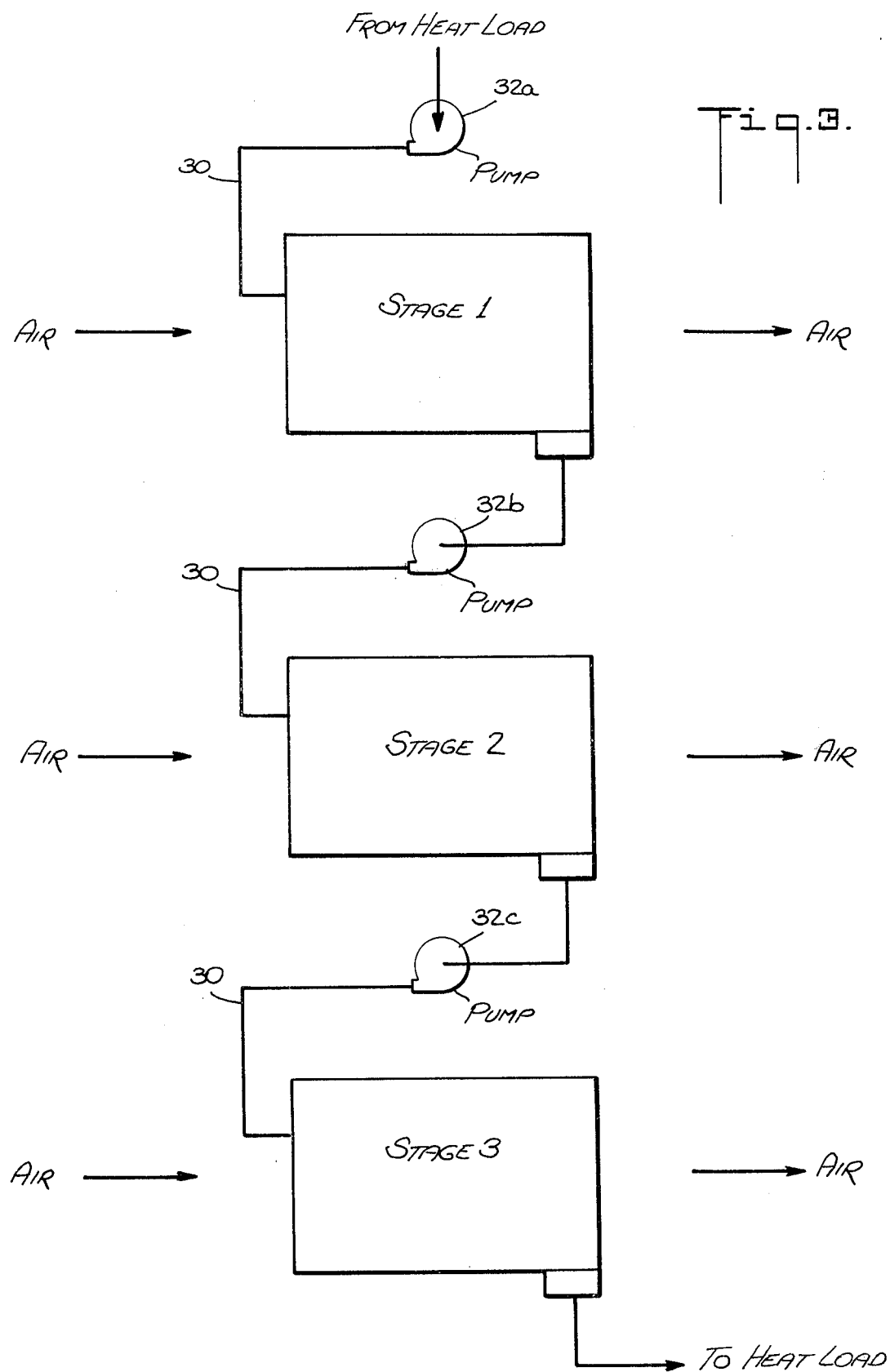

METHOD OF MULTI STAGE INJECTOR COOLING

This is a continuation, of application Ser. No. 183,015 filed Sept. 23, 1971 now abandoned.

This invention relates to a method of evaporative heat exchange in which water from which heat is to be extracted is sprayed in such fashion as to induce concurrent air flow with resulting mixing, heat exchange and partial evaporation of the water and more particularly such a method in which the water is repeatedly sprayed in a series of stages each involving inducing a new supply of air to the heat exchange.

In general, an evaporative heat exchanger is designed to deal with certain load conditions which are imposed by the needs of the use to which the apparatus is put. These include volume of water to be cooled per unit time, the amount or range of cooling of said water and air temperatures both absolute and relative to the temperatures of the water to be cooled.

To meet a higher load condition the designer of a conventional cooling tower has the option to increase the physical size of the unit or to a limited extent increase the air quantity with a resultant increase in input energy or both. In the case of an injector cooling tower (as described in application Ser. No. 144,853, filed in the U.S. Patent Office on May 19, 1971), now U.S. Pat. No. 3,807,145, much more flexibility is possible by changes in the pressure of the water spray, and therefore input energy to drive the water pumps.

Surprisingly it has been found, as a part of this invention, that with injector cooling towers one can meet higher designed heat load conditions without increase in equipment and without increase in input energy to drive the water pumps.

In an injector type cooling tower in which the water itself pumps the air, the air and water necessarily flow concurrently and therefore the initial temperature differences between the air and water tends to decrease as the fluids flow together through the apparatus. Since temperature difference has an effect on the efficiency of the heat exchange, it is apparent that this type of apparatus suffers from the effects of low temperature difference as the designed approach temperature is reached. Yet, according to the method of the present invention it is possible to reduce this effect of low temperature differential in injector type cooling towers by exposing the water to a series of stages thereby taking advantage of large air-water initial or entering temperature differences. This advantage along with the greatly increased heat transfer efficiencies achieved by series exposure to water and air dramatically decrease the size of unit necessary to deal with a particular heat load and without increase in pumping energy.

Other objects and advantages of the invention will be apparent from the following detailed description thereof in conjunction with the annexed drawings wherein:

FIG. 3 is a schematic representation of a three stage cooling tower system connected to operate in accordance with the principles of the present invention.

Figure 1:
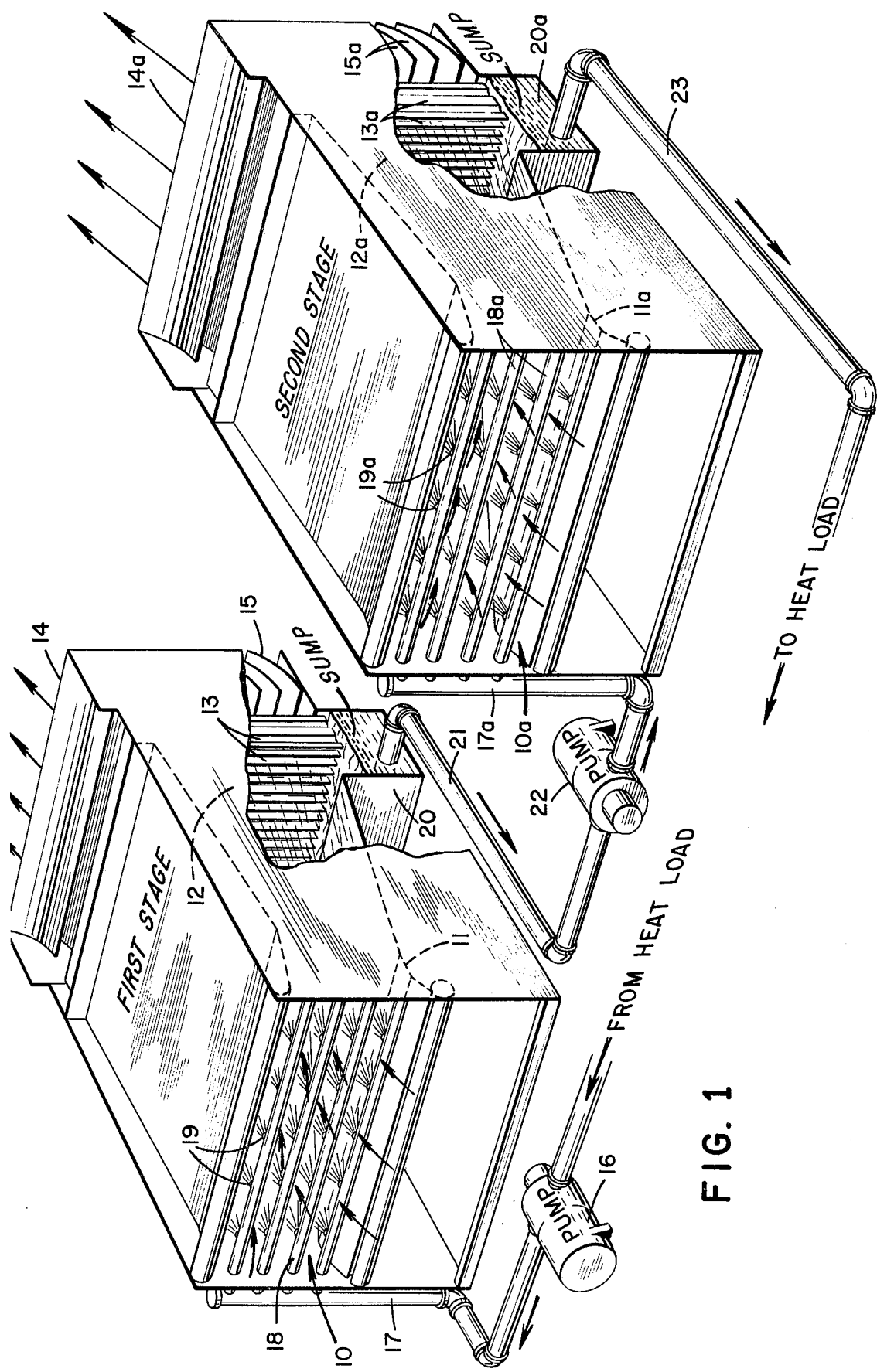
FIG. 1 is an isometric view of two injector type cooling towers connected to operate in accordance with the principles of the present invention.

Referring first to FIG. 1, it will be seen that two injector type evaporative cooling towers are illustrated. The details of the injector towers of FIG. 1 are shown in application Ser. No. 144,853, filed May 19, 1971, now U.S. Pat. No. 3,807,145. While the units shown are structurally identical, to facilitate distinguishing them in the following discussion the left unit as viewed in FIG. 1 will be referred to as the first stage whereas the right one will be referred to as the second stage. Reference numerals for like parts will bear the subscript "$a$" when referring to the second stage.

Each unit of each stage comprises an air entry mouth 10, 10$a$, a throat 11, 11$a$, and downstream of the throat a diffusion or expansion region 12, 12$a$. Beyond the expansion region there is a bank of mist eliminators 13, 13$a$, and an air exhaust region, 14, 14$a$, provided with vanes 15, 15$a$ to direct the exhausting air upwardly and outwardly from the apparatus.

Water to have heat extracted from it is pumped by a pump 16 from a heat load to header 17 of the first stage of the present method. Header 17 supplies a series of horizontal conduits 18 extending across the air entry mouth 10 of the unit. Each of the conduits 18 is provided with nozzles 19 spaced along its length. The water to have heat extracted from it is sprayed from these nozzles into the throat 11, and this has the effect of drawing in air from the surrounding atmosphere which thus constitutes the source of air for the present system. The air and water co-mingle, some of the water evaporates, the air is exhausted through the outlet 14 and the water is collected in a sump 20. This water is extracted from the sump 20, drawn through a pipe 21 by a pump 22 which delivers it to a manifold 17$a$ of the second unit, said manifold 17$a$ serving the pipes 18$a$ each of which are provided with nozzles 19$a$ in the manner of the first stage. The heat exchange process of the first stage is repeated in the second stage with the difference that the water supplied through the nozzles 19$a$ is water which has already had heat extracted from it in passage through the first stage. The source of air for the two units is, however, the same so that water issuing from nozzles 19 and 19$a$ is exposed to the same temperature air. The water issuing from the second unit is collected in a sump 20$a$ and delivered through a pipe 23 to the heat load.

In order better to demonstrate the value of the multistage operations constituting the present invention, reference is made to the following examples.

EXAMPLE 1

Suppose a load of 100,000 GPM (gallons per minute) with a required water temperature reduction of 40°F from 125°F to 85°F. Suppose also an ambient air wet bulb temperature of 72°F at entry (mouth 10 of FIG. 1). A single unit of the type shown in FIG. 1 adequate to deal with such a load would require a throat cross section area (11 of FIG. 1) of about 80,640 square feet and 2900 BHP (Brake horsepower) with a 79.4°F wet bulb at exhaust (14 of FIG. 1). Such a unit is very large and proportionately expensive to build and maintain. Yet if instead of using such a unit, the staging method of the present invention is employed the following dramatic reduction in size is achieved:

| First Stage | |
|---|---|
| Flow | 100,000 GPM |
| Load | 125° to 97.5° F. |
| Throat area | 15,120 square feet |

-continued

| First Stage | |
|---|---|
| Energy | 1450 BHP |
| Air temperature | 72° F. wet bulb at 10 of Figure 1 |
| Air temperature | 90.1° F. wet bulb at 14 of Figure 1 |
| Second Stage - | |
| Flow | 100,000 GPM |
| Load | 97.5° to 85° F. |
| Throat area | 15,120 square feet |
| Energy | 1450 BHP |
| Air temperature | 72° F. wet bulb at 10a of Figure 1 |
| Air temperature | 81.2° F. wet bulb at 14a of Figure 1 |

Throat area, first stage, 15,120 square feet + throat area, second stage, 15,120 square feet = 30,240 square feet. Throat area single unit less sum of throat areas of stages 1 and 2 is: 80,640 square feet − 2(15,120) = 50,400 square feet or 62% saved in unit size by practicing the present method.

Thus, it is seen that the reduction in needed throat cross section is more than 50,000 square feet.

When two stages are connected in series as shown in FIG. 1 of the drawings it is apparent that energy is put into the water at two places. If half of the energy required by a large single unit is put in at each of these places the total will be the same. Brake hosepower is a function of pressure for any given flow (GPM); thus, if half the pressure is applied in each of two places in series the sum will be the same (1450 BHP + 1450 BHP = 2900 BHP).

Hence in this example, there is no increase in BHP along with a savings of 50,400 square feet in throat area or 62%.

A second example dealing with a much smaller water flow is further demonstrative of the savings in size to be achieved by practicing the present method:

EXAMPLE 2

| Single Unit - | |
|---|---|
| Flow | 1000 GPM |
| Load | 103–85° F. → 18° Range |
| Throat area | 360 square feet |
| Energy | 41.2 BHP |
| Wet bulb air temperature at entry | 78° F. |
| Wet bulb air temperature at exit | 82.9° F. |
| First Stage - | |
| Flow | 1000 GPM |
| Load | 103–91° F. |
| Throat area | 95 square feet |
| Energy | 20.6 BHP |
| Wet bulb air temperature at entry | 78° F. |
| Wet bulb air temperature at exit | 87.6° F. |
| Second Stage - | |
| Flow | 1000 GPM |
| Load | 91–85° F. |
| Throat area | 95 square feet |
| Energy | 20.6 BHP |
| Wet bulb air temperature at entry | 78° F. |
| Wet bulb air temperature at exit | 82.9° F. |

Thus for this second example, there is achieved a savings of 170 square feet or about 47.2% in throat area at the same brake horsepower.

Figure 2:
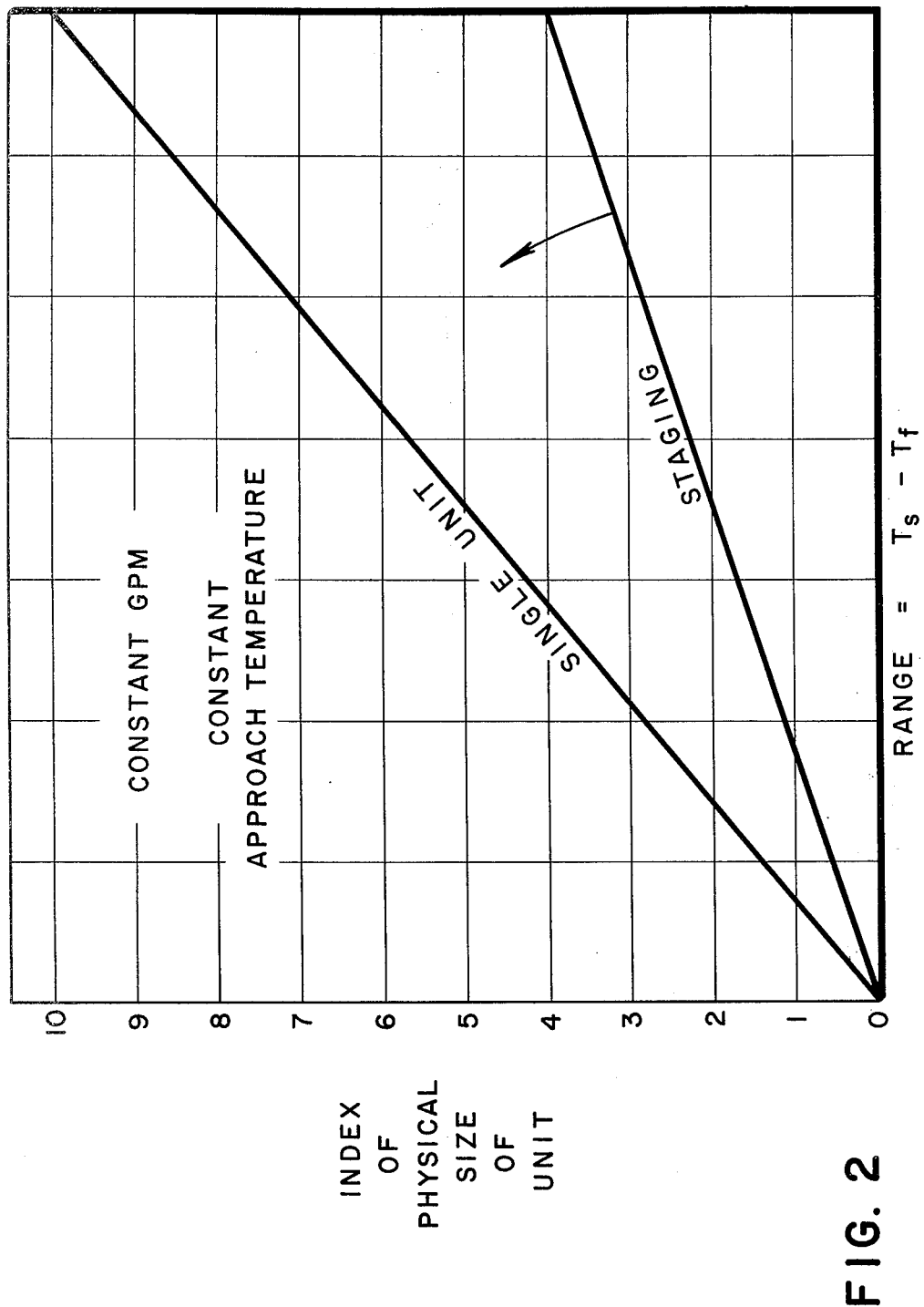
FIG. 2 is a graph in which physical size of the injector is plotted against heat loads to demonstrate the advantages of the method of the present invention in comparison to conventional methods.

To illustrate further the effects of the present invention reference is made to FIG. 2. Here is plotted for both single and series staging of injector cooling towers, physical size index as the ordinate versus range as the abscissa. This plot is for a constant design approach temperature. To be sure that FIG. 2 and the examples above are understood, the term "range" is used to define the range of cooling to which the water is to be subjected. To cool water from 125° to 100° is a range of 25°. The expression "approach temperature" means the difference between the wet bulb temperature of the entering air, see FIG. 1, mouths 10 – 10a, and the leaving water temperature, see FIG. 1 at sumps 20 – 20a.

In FIG. 2 the ordinate is an index of physical size. Since certain proportions are necessary in injector cooling towers a practical index of size is the throat area if a venturi is used and if water is sprayed into a tube of uniform section then the area of that section is an index of size. $Ts - Tf$ means simply range as defined above, i.e., the difference in water temperature at start $Ts$ and at finish $Tf$. Again to relate to the drawings in FIG. 1, $Ts$ is at pump 16 while $Tf$ is at sump 20a.

In FIG. 2 the line designated "single unit" illustrates the increase in physical size necessary for a single pass unit to deal with higher temperature ranges under fixed GPM and approach temperature conditions. The line marked "staging" plots the total throat size of two units operated with water in series and air in parallel and is at the same total input energy or BHP as the single unit line. In this case the sum of the throat sizes is dramatically less than that required for the single unit capable of handling the same load. Since the cost of cooling towers is roughly proportional to their size, a reduction in throat area requirements is, in effect, a reduction in cost of manufacture, and a reduction of 60 percent in cost of manufacture is a dramatic achievement, see Example 1 and right edge of FIG. 2. Therefore substantial savings in the cost of injector cooling towers can be made by staging with constant input energy.

However, if input energy and therefore operating cost is a more important design consideration than initial cooling tower cost (i.e., less input energy available), staging still offers an advantage. This concept can be understood by imagining the staging line being rotated counterclockwise about its origin from its original position to the single stage line as illustrated by the arrow in FIG. 2. As the staging line is rotated counterclockwise, the input energy decreases.

Thus by staging, the input energy can be decreased substantially from that of the single unit before the value of the index of physical size of staging becomes equal to that of the single unit.

While FIG. 1 illustrates two stages of cooling with the water in series, it is contemplated as a part of the invention that stages in excess of two will be used to meet certain operating conditions. As shown in FIG. 3, for example, there are provided three stages connected in series by a common water line 30 with individual pumps 32a, 32b and 32c interposed in the line 30 in advance of each stage.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. The method of extracting heat from a liquid that comprises spraying said liquid into a confined region having an end open to a source of first gas at a wet bulb temperature lower than that of the spray liquid, causing said spray to induce flow of said first gas from said source into said confined region for mixing and partial evaporation of said liquid, separating the so mixed first gas from said liquid and collecting the latter at a first temperature above the wet bulb temperature of the separated first gas, spraying said liquid into another confined region having an end open to a source of second gas at a wet bulb temperature no higher than that of the first gas at said first mentioned source, causing said spray to induce flow of said second gas from said source into said other confined region for mixing and partial evaporation of said liquid, separating the second gas and liquid and collecting the liquid at a second temperature above the wet bulb temperature of the separated gas but below the wet bulb temperature of the separated first gas, the combined total cross sectional area of both said confined regions being less than the cross sectional area of a single similar confined region capable of cooling said liquid to said second temperature.

2. The method of claim 1 wherein the liquid at said second temperature is further sprayed successively into one or more confined regions each of said regions having an end open to a source of gas at a wet bulb temperature no higher than at said first mentioned source.

3. The method of extracting heat from water that comprises spraying said water into a confined region having an end open to a source of atmospheric air at a wet bulb temperature lower than that of said spray water, causing said spray to induce a first air flow from said source into said confined region for mixing and partial evaporation of said water, exhausting said first air, collecting the remaining water at a first temperature above the wet bulb temperature of the exhausting first air, and spraying the same into another confined region having an end also open to said source of atmospheric air, causing said spray to induce a second air flow from said source into said other confined region for mixing and partial evaporation of said water and collecting said water at a second temperature above the wet bulb temperature of the exhausting air but below the wet bulb temperature of the exhausted first air, the combined total cross sectional areas of both said confined regions being less than the cross sectional area of a single similar confined region capable of cooling said water to said second temperature.

4. The method of claim 3 wherein the water at said second temperature is further sprayed successively into one or more confined regions each of said regions having an end open to a source of atmospheric air at a wet bulb temperature no higher than at said first mentioned source.

5. The method of claim 3 in which the energy of the water sprayed into said first and said other confined region is equal.

6. The method of claim 3 in which said first and said other confined region are of substantially equal size.

* * * * *